United States Patent [19]

Lo et al.

[11] 3,795,137

[45] Mar. 5, 1974

[54] LEAK DETECTION APPARATUS FOR AEROSOL CONTAINERS

[75] Inventors: Mei-Kuo Lo; Gary R. Thompson; Erwin Sheppard, all of Racine, Wis.

[73] Assignee: S. C. Johnson & Son, Inc., Racine, Wis.

[22] Filed: Sept. 12, 1972

[21] Appl. No.: 288,461

[52] U.S. Cl.............................. 73/45.4, 209/111.9
[51] Int. Cl. ............................................ G01m 3/24
[58] Field of Search ...... 73/41, 45, 45.1, 45.2, 45.4, 73/49.2, 49.3, 52; 209/111.9; 181/.5 LD

[56] References Cited
UNITED STATES PATENTS

| 2,433,043 | 12/1947 | Gray | 73/45.2 |
|---|---|---|---|
| 3,091,958 | 6/1963 | Robins | 73/45.2 |
| 3,431,773 | 3/1969 | Calhoun | 73/45.2 X |
| 3,465,572 | 9/1969 | Covert | 73/41 X |

*Primary Examiner*—Richard C. Queisser
*Assistant Examiner*—Joseph W. Roskos

[57] ABSTRACT

An apparatus for detecting leaks in pressurized containers in a production line environment by means of ultrasonic noise detection, a preferred embodiment comprising a rotatable table having a peripheral area adjacent to a conveyor line and having portions covered by damping material, blocks peripherally spaced on the peripheral portion of the table to define spaces for carrying containers, the blocks having side walls of acoustic-absorbing material and end walls comprising acoustic barrier material, shield means forming a tunnel through which a peripheral portion, including the blocks, passes, the shield means comprising acoustic barrier material, the shield means also including extension portions adjacent to either surface of the table and comprising acoustic-absorbing material on the inside surfaces, at least one detection chamber defined within the tunnel, ultrasonic noise detector means within the chamber, means to feed cans seriatim through the chamber and means to reject containers in response to leaks detected therein.

17 Claims, 7 Drawing Figures

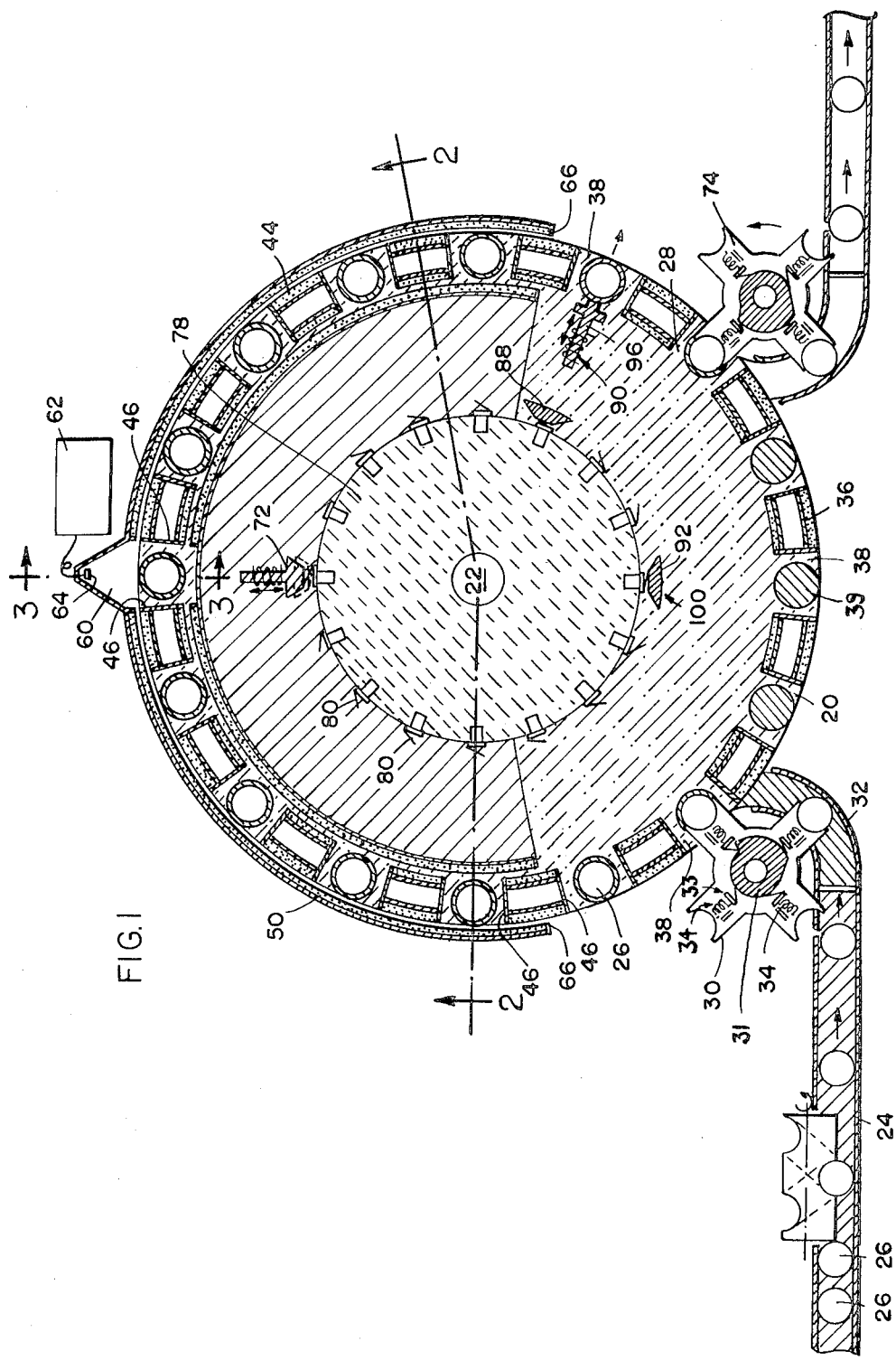

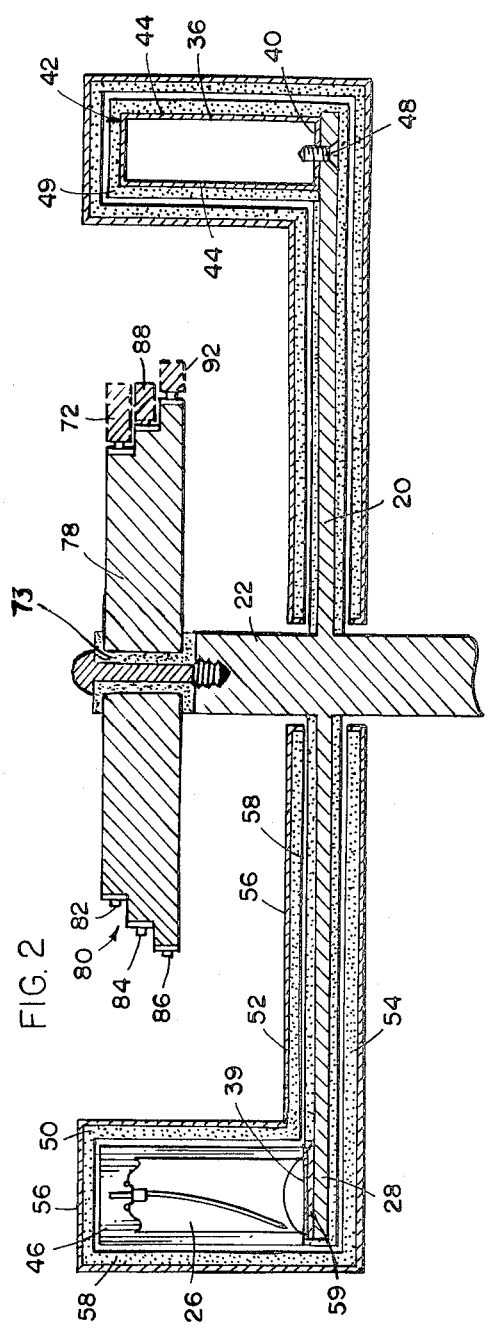
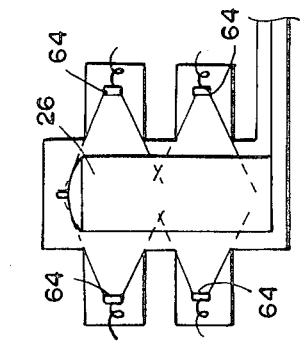
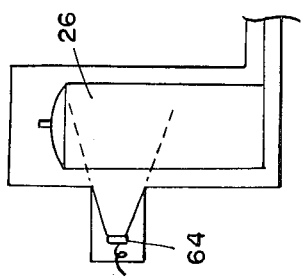
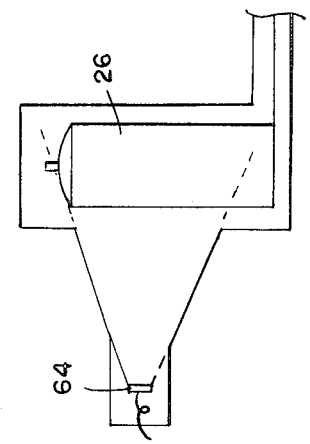

LEAK DETECTION APPARATUS FOR AEROSOL CONTAINERS

BACKGROUND OF THE INVENTION

This invention relates to an apparatus for testing filled aerosol containers for leaks.

The most common method used in testing for leaks in filled aerosol containers has been the passing of such containers through a bath of hot water. The internal pressure causes visible leakage which may be observed by persons stationed adjacent to the tank who proceed to remove such containers from the line. There are several obvious disadvantages to this method including the necessity of using employees to observe the process, the fallibility of human beings, and the difficulty in detecting very small leaks at a high production speed.

Other methods have been explored. One such method involves the use of ultrasonic noise detection equipment. Such equipment has the ability to detect the noise of leaks even though such is not in the audible frequency range and even though such may be of limited amplitude. Significant problems are encountered in using ultrasonic noise detection means to detect leaks in aerosol cans. Although such detection means may be successfully used in the laboratory to detect leaks in aerosol cans, significant new problems are presented in the environment of a production factory.

Specifically, in a production environment, there are noises arising from equipment and other general activity at many frequency ranges and at extreme amplitudes. Such noises destroy the ability of ultrasonic detection equipment to perform the function of leak detection, which involves, as previously indicated, fairly low leak noise amplitudes. Although the intense noise in a plant is generally concentrated in the low frequency range and that of an aerosol leak is concentrated in a higher frequency range, there are enough plant noises generated in such higher frequency ranges that it is impossible to screen out plant noises by using a narrow high frequency response band in the ultrasonic noise detector.

To reduce the background noise in the frequency range of leaks, it is necessary to acoustically isolate the container being tested. However, at production speeds, previously known devices for achieving such acoustic isolation give rise to generation of large solid-borne noises which, like air-borne noises, can destroy the ability of the ultrasonic noise detector to detect leaks.

This invention overcomes the aforementioned problems by providing a unique ultrasonic leak detector apparatus for aerosol cans incorporating unique shielding and isolation apparatus. A rotatable table has a peripheral portion, preferably right at the edge thereof, which passes through an acoustic barrier material. Aerosol containers on the peripheral portion of the table are acoustically isolated one from the other inside this tunnel by means of acoustic blocks spaced on a peripheral portion of the table. An acoustic-absorbing material is affixed to either or both the inside of the tunnel and/or the adjacent side surfaces of the blocks to absorb noise entering the ends of the tunnel. The tunnel is a part of a shield means which also includes portions extending from the base of either tunnel wall, outwardly from the tunnel and closely adjacent to the surfaces of the table. Acoustic-absorbing material is affixed to either or both of these facing surfaces to absorb noises entering along the tunnel. Midway along the tunnel is a leak detection chamber which is defined by shield means forming the tunnel and by sides of the blocks on either side of the container. The leak detection chamber is effectively shielded from the environmental noise by the shield means and the acoustic blocks inside the tunnel. An ultrasonic detector is located in this chamber to activate a reject mechanism upon the detection of a leak. Various features and details of this invention will hereafter be set forth in detail.

An object of this invention is to overcome the aforementioned problems associated with the detection of leaks in filled aerosol containers.

A specific object of this invention is to provide an apparatus for detecting leaks in pressurized containers by the use of ultrasonic noise detection equipment in a noisy enviroment.

A further object of the invention is to provide, in a high speed filling and sealing line, in-line apparatus to detect leaks in aerosol containers by means of ultrasonic noise detection equipment.

Yet another object of this invention is to provide unique shielding and isolation means whereby individual containers may be tested in a high speed filling and sealing line by means of ultrasonic noise detection equipment.

Another object of the invention is to provide leak detection equipment which eliminates human error in the detection process.

A still further object of the invention is to provide leak detection equipment which has capability to detect very small leaks.

These and other important objects of this invention will become apparent from the description and from the drawings showing preferred embodiments wherein:

FIG. 1 is a schematic plan view showing the leak detection apparatus of this invention with a covering portion removed to reveal some functional details.

FIG. 2 is a schematic sectional view, as shown by section 2—2 in FIG. 1 with additional parts indicated in phantom lines.

FIG. 3 is a schematic sectional view of the leak detection chamber, as shown by section 3—3 in FIG. 1.

FIGS. 4 and 5 are alternative arrangements of the mechanism of FIG. 3.

Figure 7:
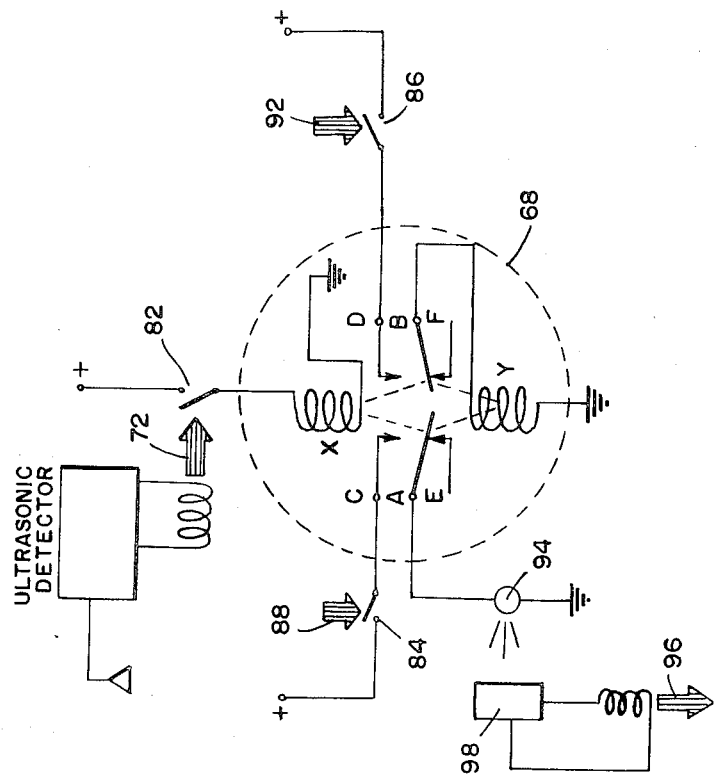
FIG. 7 is an electrical schematic setting forth circuits of the preferred embodiment of this invention which is shown in FIG. 1.

Reference is now made in detail to the drawings, in which like numerals will be used to indicate like parts. Referring specifically to FIGS. 1 and 2, a rotary table 20 is affixed to vertical shaft 22 which turns within a base structure not shown which is generally below table 20. A suitable means to rotate table 20 includes, in this preferred embodiment, an electric motor and linkage to shaft 22. Many other devices could be used to provide a means to rotate table 20, and such would be known to those skilled in the art who are also made familiar with this invention.

Table 20 is peripherally adjacent to a conveyor line 24 which carries filled and sealed pressurized containers 26. Table 20 has a peripheral portion 28 which is adapted to carry containers received from conveyor line 24. Blocks 36 are peripherally spaced along peripheral portion 28 of table 20 and define spaces 38 therebetween. Star wheel 30, guide rails 32, stationary cam 31, microswitches 33, and electromagnets 34 form a means to feed containers seriatim from conveyor line 24 to spaces 38 along peripheral portion 28 of rotary table 20. Electromagnets 34 are deactivated when a container reaches the common tangent point of rotating table 20 and rotating star wheel 30, thereby releasing the container onto table 20 in a space 38. Magnetic pad 39 may be connected to table 20 to form at least a part of the table surface in each space 38 in order to hold the container firmly to rotating table 20. The magnets in the table will also facilitate the transfer at high speed of a container from star wheel 30 to a space 38 and allow rapid table rotation without dislodging the containers. Various other well-known means may be used to feed containers from conveyor line 24 to spaces 38 of rotary table 20. To further facilitate the operation of the apparatus shown, blocks 36 may be moved radially inward in relation to the axis of table 20 in the vicinity of star wheel 30 to move blocks 36 to a less interferring position. This could readily be accomplished by a camming action.

Blocks 36, one of which is shown in cross-section in FIG. 2, have sheet metal bottoms 40, tops 42, sides 44, and ends 46 (FIG. 1). Bottoms 40 are connected firmly to rotary table 20 by fasteners 48. Sides 44 are aligned generally parallel with the periphery of table 20 while end walls 46 are aligned radially with respect to the axis of shaft 22. The metal material used is an acoustic barrier material, that is, a generally dense, hard material through which air-borne noise will have difficulty penetrating. Materials other than metal which have barrier characteristics are also satisfactory. The outside surfaces 49 of sides 44 and tops 42 of blocks 36 are made of an acoustic-absorbing material.

A shield 50 connected, with vibration damping material (not shown), to the base structure (not shown) forms a tunnel above and along a portion of peripheral portion 28. In the embodiment shown, shield 50 extends for just over a 180° portion of peripheral portion 28. Shield 50 is located and has inside dimensions such that when blocks 36 pass therethrough by rotation of table 20, there is very little clearance between top 42 and shield 50 and between sides 44 and shield 50. Shield 50 includes an upper shield extension 52 extending above table 20 from the shield portion defining the tunnel radially inward with respect to the axis of table 20. Likewise, a lower shield extension 54 extends radially inward below table 20. Again, in each case, the clearance between the extensions and the surfaces of table 20 should be kept as small as practical for effective absorption of noise which might otherwise enter the tunnel. The extension members may extend from the base of the tunnel walls in directions other than radially inwardly, depending on table design and other factors. It is important only that there be closely adjacent surfaces of extensions and table to allow absorption of noises otherwise entering along the tunnel.

Shield 50 has a barrier layer 56 which is constructed of an acoustic barrier material such as a dense, hard sheet metal. This construction will inhibit penetration of sound through shield 50. The inside surface 58 of shield 50 is, like outside surfaces 49 of top 42 and sides 44 (of blocks 36), made of an acoustic-absorbing material. These acoustic-absorbing surfaces absorb airborne noises penetrating or by-passing barrier layer 56 through the clearance between the stationary tunnel and rotating table 20 and blocks 36 to insure that enviromental air-borne noise entering the tunnel through the clearance between shield 50 and blocks 56 will be effectively absorbed.

Containers 26 move through the tunnel as table 20 rotates. Under the containers and connected to table 20 is a pad 59 of vibration damping material which covers table 20 in spaces 38. Damping pad 59 may be made of materials such as rubber and other preferably non-porous, flexible materials. Pad 59, which could be extended to cover the entire surface of table 20, serves to prevent solid-borne noises from entering the area around the containers in the tunnel. Although liberal use of damping material is preferred, it may be eliminated if solid-borne noises can be drastically reduced, such as by the use of "silent" bearings.

Midway through the tunnel there is a detection chamber 60, shown in FIG. 1, through which containers 26 pass seriatim. Detection chamber 60, which forms a part of the tunnel, is defined by adjacent end walls 46 of adjacent blocks. The chamber is preferably lined with sheet metal material. with little or no acoustic-absorbing material on the inside surface in order to aid retention of the noises of leaks from containers 26 within the chamber and reflect them to the microphone 64. The noise of leaks will be detected in chamber 60 by an ultrasonic noise detector 62. Detection units such as those made by Jewlett-Packard, E.I., Inc., or Techsonics may be used in the device of this invention. Pickup microphones 64 may be placed in chamber 60 or flush with the inside surface of chamber 60, as illustrated in FIG. 1. It is preferable that the microphone or other pick-up devices be connected to shield 50.

Figure 6:
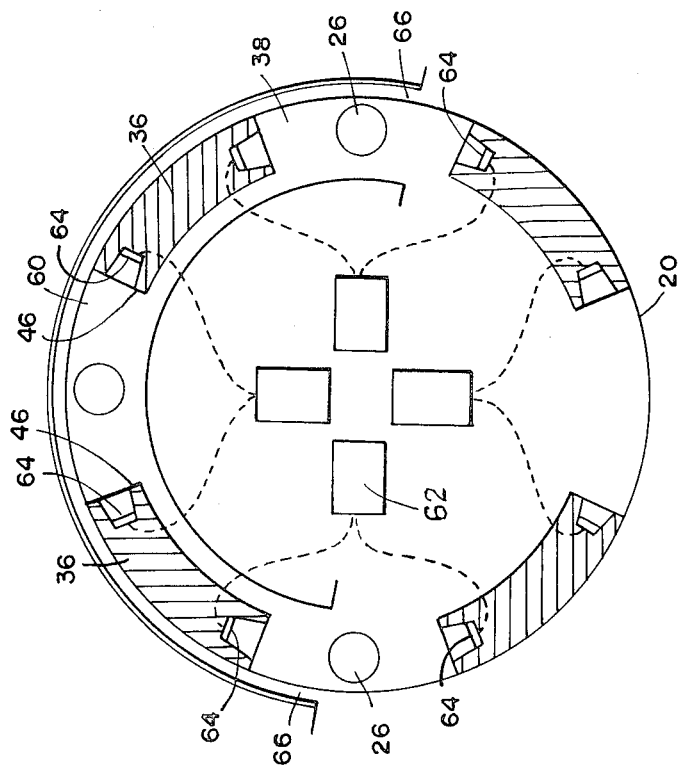
FIG. 6 is a plan schematic view showing a further alternative arrangement of ultrasonic noise detector microphones in the apparatus of this invention.

The arrangement of one or more microphones in the detection chamber may be varied, as illustrated by FIGS. 3, 4, and 5, each of which schematically illustrates a detection chamber, and by FIG. 6 which illustrates an alternative arrangement in which there are a multiplicity of detection chambers 60. In FIG. 4, the microphone is placed very close to the test container. A close placement is normally preferable. However, to readily detect leaks in, for example, the lower portions of a container 26, the microphone might be placed back away from the container, as shown in FIG. 3. Alternatively, several microphones may be placed close to the container at various locations therearound, as shown in FIG. 5. The exact placement would vary depending on factors including anticipated leak location and detector sensitivity.

By using the alternative arrangement shown in FIG. 6, the "listening time" can be increased. In this embodiment, a detection chamber is formed between each adjacent pair of blocks; however, since microphones 64 are attached to ends 46, the chambers are not at any fixed location. An effective detection chamber is formed as the spaces 38 move through the tunnel at locations away from the tunnel ends 66. Detectors 62 are timed to operate effectively for each space as it is within the tunnel and remote from tunnel ends 66.

Referring again in particular to the preferred embodiment of FIGS. 1 and 2, a second star wheel 74 is used to remove tested containers which have no leaks. The removal from table 20 to a downstream portion 76 of the conveyor line is accomplished in a manner, and with equipment, similar to that associated with star wheel 30, and no further description is deemed necessary except that it should be pointed out that the magnetic force of the electormagnetic in star wheel 74 should be stronger than that of magnets 39 on rotatable table 20 so that the containers may readily be removed from table 20.

The rejection of containers having leaks detected by detector 62 is accomplished by a simple circuit and associated apparatus as shown in FIGS. 1, 2, and 7. Fixedly connected to vertical shaft 22, through vibration damping or absorbing material 73, is a rotary disk 78 which rotates with table 20. Spaced about the periphery of disk 78 are switch sets 80, one for each of spaces 78, and preferably each radially aligned with its corresponding space. Each switch set 80 has three switches vertically spaced on the periphery of disk 78. These are shown in FIG. 2 and are designated as first switch 82, second switch 84, and third switch 86. A first stationary electromagnetic plunger 72 is positioned radially adjacent detection chamber 60 and disk 78, as shown in FIG. 1. A first stationary cam 88 is positioned radially adjacent to a reject station 90 and disk 78, while a second stationary cam 92 is positioned radially adjacent to a position between star wheels 30 and 74 and disk 78, as shown in FIG. 1. The relative vertical positions of cams 88 and 92 and first electromagnetic plunger 72 are illustrated by phantom lines in FIG. 2.

The output of ultrasonic noise detector 62 is connected to the electromagnetic of first plunger 72. If the leak noise of a leaking can under test is above the trigger level of detector 62, first plunger 72 will be actuated by its electromagnet and momentarily close the first switch 82 of a switch set which is associated with the space in which the leaking container is located. The momentary closing of first switch 82 will momentarily energize coil X of a double-pole double-throw relay 68 which is associated with the space in which the leaking container is located. Similar relays are associated with each of spaces 38 shown in FIG. 1. The momentary energization of coil X will connect terminals A to C and B to D. When the same switch set rotates with the table to reach rejection station 90, which is located just beyond the tunnel end, second switch 84 will be momentarily closed by first cam 88. If the can is a leaker, terminals A and C will be in contact as previously described and the closing of second switch 84 will turn on a light bulb 94, which in turn actuates a second electromagnet plunger 96 through a phototube 98. Similar light bulbs are associated with each of spaces 38 shown in FIG. 1. Second plunger 96 pushes the defective container from table 20 before it reaches star wheel 74.

If the can were not a leaker, first switch 82 would not have been closed since first plunger 72 would not have been actuated by detector 62. Therefore, relay 68 would not have been actuated and the contacts of relay 68 would have remained in a pre-set condition of A connected to E and B to F. Therefore, the subsequent closing of second switch 84 would not have lit bulb 94 Therefore, the reject mechanism would have remained inactive.

After passing reject station 90, each switch set 80 passes a reset position 100 between star wheels 30 and 74 where second cam 92 momentarily closes third switch 86. This will energize coil Y, if B and D, and A and C were in contact, to return the relay to the aforementioned pre-set condition. Thereafter, a new container will be received from conveyor line 24 for leak testing as described.

Other circuitry and apparatus can be used to provide satisfactory means to activate a reject mechanism in response to leak detection by ultrasonic noise detection means. Acceptable variatiosn would be apparent to those skilled in the art who are made familiar with this invention.

The preferred material for use as an acoustic barrier in the apparatus of this invention is sheet steel. Other sheet metals may also be used. Concrete or high density synthetic plastics are also possible for use as barrier material. It is noted that materials of high density are most satisfactory because a sufficient barrier may be achieved without inordinate thickness. Suitable materials for use as acoustic-absorbing material include various foams, such as polyurethane, polyethylene, or other polymer foams, and various natural or synthetic fiber materials.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus by which leaks in filled pressurized containers may be detected at production line speeds using an ultrasonic leak detection method, said apparatus comprising:
    a base;
    a table rotatably connected to said base, said table being peripherally adjacent to a conveyor line for filled pressurized containers and having a peripheral portion adapted to carry containers;
    shield means connected to said base and defining a tunnel above and along a portion of said peripheral portion, said shield means including extension portions extending from the base of either wall of said tunnel and closely adjacent to surfaces of said table, said shield means comprising an acoustic barrier material, said extension portions and the adjacent table surfaces having at least one facing surface of an acoustic-absorbing material affixed therebetween;
    blocks peripherally spaced on said peripheral portion of said table defining spaces therebetween for containers, said blocks having peripherally spaced end walls comprising acoustic barrier material, and having adjacent side walls spaced radially with respect to the axis of rotation of said table, said side walls and the inner surfaces of said tunnel having at least one facing surface of an acoustic-absorbing material;
    at least one detection chamber defined by said shield means and adjacent end walls of adjacent blocks;
    an ultrasonic noise detector located in said at least one detection chamber; means to feed cans seriatim from said conveyor line onto said spaces of said table at a first location off an end of said tunnel;

means to rotate said table to locate said successive containers seriatim in said at least one detection chamber;

means downstream of said tunnel to reject defective containers;

means to activate said reject means in response to a signal from said ultrasonic noise detector; and means to remove containers from said table.

2. The apparatus of claim 1 wherein said inside surface of said tunnel comprises an acoustic-absorbing material.

3. The apparatus of claim 1 wherein the surface of said side walls comprise an acoustic-absorbing material.

4. The apparatus of claim 3 wherein said inside surface of said tunnel comprises an acoustic-absorbing material.

5. The apparatus of claim 1 wherein said extension portions and said adjacent table surfaces have facing surfaces of an acoustic-absorbing material.

6. The apparatus of claim 5 wherein said inside surface of said tunnel and said surfaces of said side walls comprise acoustic-absorbing material.

7. The apparatus of claim 1 wherein said peripheral portion of said table is covered by a damping material.

8. The apparatus of claim 1 wherein said peripheral portion of said table has magnetic surfaces between said blocks to hold containers in said spaces.

9. The apparatus of claim 8 wherein said peripheral portion of said table is covered by a damping material.

10. The apparatus of claim 1 wherein a single said detection chamber is at a fixed location long said tunnel.

11. The apparatus of claim 10 wherein said detector comprises at least one microphone mounted to said shield means in said chamber.

12. The apparatus of claim 10 wherein said detector comprises a multiplicity of microphones mounted to said shield means in said chamber.

13. The apparatus of claim 1 wherein detection chambers are defined between each adjacent pair of said blocks within said tunnel.

14. The apparatus of claim 13 wherein, in each of said chambers, said detector comprises at least one microphone mounted to said end walls at said blocks.

15. The apparatus of claim 1 wherein said extension portions extend radially inwardly from said peripheral portion of said table adjacent opposite surfaces of said table.

16. The apparatus of claim 15 wherein said extension portions and said adjacent table surfaces have facing surfaces of an acoustic-absorbing material.

17. The apparatus of claim 16 wherein said inside surface of said tunnel and said surfaces of said side walls comprise acoustic-absorbing material.

* * * * *

UNITED STATES PATENT OFFICE
CERTIFICATE OF CORRECTION

Patent No. 3,795,137                    Dated March 5, 1974

Inventor(s) Mei-Kuo Lo, Gary R. Thompson and Erwin Sheppard

It is certified that error appears in the above-identified patent and that said Letters Patent are hereby corrected as shown below:

Column 6, claim 1, lines 32-34, clause starting "means to feed cans seriatim...said tunnel;" should be set apart in a manner similar to the other subsections of claim 1.

Column 8, claim 14, line 3, change "at" to "of".

Signed and sealed this 22nd day of October 1974.

(SEAL)
Attest:

McCOY M. GIBSON JR.                C. MARSHALL DANN
Attesting Officer                  Commissioner of Patents